United States Patent [19]

Callaghan et al.

[11] Patent Number: 5,369,889
[45] Date of Patent: Dec. 6, 1994

[54] SINGLE GYRO NORTHFINDER

[75] Inventors: Timothy J. Callaghan; Werner H. Egli, both of Minneapolis, Minn.

[73] Assignee: Honeywell Inc., Minneapolis, Minn.

[21] Appl. No.: 882,865

[22] Filed: Jul. 7, 1986

[51] Int. Cl.$^5$ .................. G01C 19/00; G01C 19/38
[52] U.S. Cl. ........................................ 33/321; 33/324; 33/337; 364/434; 364/559
[58] Field of Search .............. 33/318, 319, 320, 321, 33/324, 322, 337, 326, 328; 73/178 B; 364/434, 559

[56] References Cited

U.S. PATENT DOCUMENTS

| | | | |
|---|---|---|---|
| 3,131,292 | 4/1964 | Tobin | 33/321 X |
| 3,281,581 | 10/1966 | Lerman et al. | 33/321 X |
| 3,330,945 | 7/1967 | Gevas | 364/559 X |
| 3,480,766 | 11/1969 | Lerman et al. | 33/331 X |
| 4,214,482 | 7/1980 | Bouchard | 33/326 X |
| 4,321,678 | 3/1982 | Krogmann | 33/324 X |
| 4,693,114 | 9/1987 | DeCarlo et al. | 33/320 X |

Primary Examiner—Stephen C. Buczinski
Attorney, Agent, or Firm—Robert A. Pajak

[57] ABSTRACT

Disclosed is a northfinding apparatus having a single rotation rate sensor secured to a platform. The output of the rotation rate sensor is corrected for tilt and tilt rate of the platform. Measurements of the tilt and tilt rate and the rotation rate are combined to provide an azimuth angle of the platform relative to north.

5 Claims, 6 Drawing Sheets

SINGLE GYRO NORTHFINDER

This invention relates generally to instruments requiring instrumentation requiring knowledge of the position of the instruments relative to north. Specifically, this invention relates to a robust tactical northfinder which functions in the presence of tilt rates generated by settling motion.

BACKGROUND OF THE INVENTION

In battle field scenarios, there are many applications in which a weapon system is moved by a transport vehicle to a new location in the battle field. Before firing the weapon system, the position of the platform of the weapon system relative to true north must be known before firing. This is specifically the case when the weapon system is fired from a remote control center.

In the above scenario, the position of the weapon system relative to true north must be found rapidly. This is so since the weapon system may be fired and then quickly moved to a new location to avoid being located by the opponent. It is desirable that such weapon systems obtain a bearing relative to north even when the weapon system is still "settling". when newly arrived and standing at the new location, particularly on soft ground.

OBJECT OF THE INVENTION

It is an object of the invention to provide a low cost, robust, northfinding instrument. It is another object of the invention to provide a northfinding instrument which will take into consideration settling movement of the northfinding instrument.

BRIEF DESCRIPTION OF THE INVENTION

In the present invention, an angular rate sensor provides an angular rate measurement related to the rate of rotation of the earth, a tilt indicator provides a measurement of the rate of tilt along the input axis of the angular rate sensor, and a second tilt indicator provides an indication of the tilt about a secondary axis of the inertial rate sensor platform. The outputs of the angular rate sensor and the tilt indicator and the tilt rate indicator are combined to provide an angular measurement of the position of the inertial platform relative to north.

DETAILED DESCRIPTION OF THE INVENTION

Figure 1:
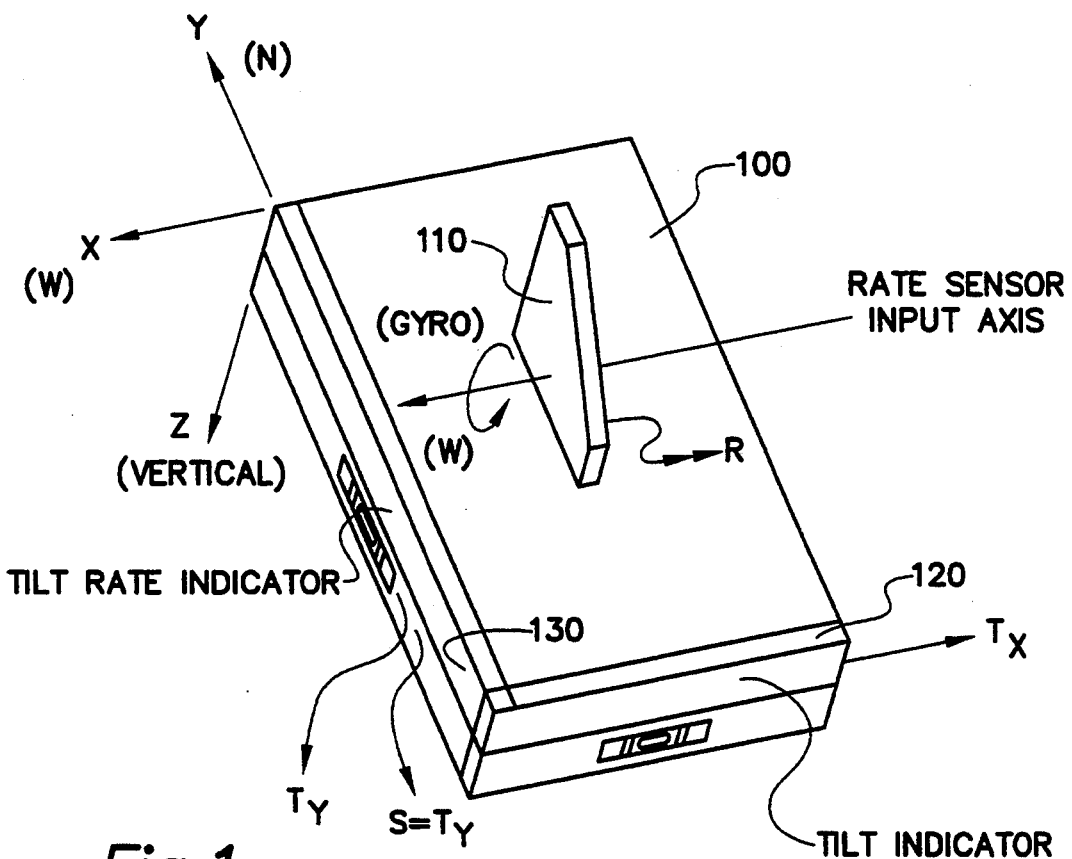
FIG. 1 is a diagram illustrating a north finding apparatus in accordance with the present invention and a depiction of a reference coordinate system.

Shown in FIG. 1 is a reference platform 100 for supporting angular rate sensor 110, tilt indicator 120 and tilt rate indicator 130. FIG. 1 also shows an XYZ right hand orthogonal coordinate system relative to platform 100 in the following manner. The angular rate sensor 110 is shown to have an input axis which is parallel with the X-axis. The Z axis is shown perpendicular to the plane of platform 100. Lastly, the Y-axis is shown to be perpendicular to the X and Z axes.

Tilt indicator 120 is shown simply as a bubble level indicator having an output signal $T_x$ representative of the amount of tilt of platform 100 about the Y-axis. Tilt rate indicator 130 is shown also to be a bubble level indicator having an output signal representative of the tilt $T_y$ of platform 100 about the X-axis. Further, indicator 130 provides rate of tilt output signal S, the time differentiation of $T_y$. Bubble level indicators and the like having the intended output signals are well known. It should be noted that the rate of tilt as measured by the rate of tilt indicator 130 is an angular rotation rate which will be sensed by the angular rate sensor 110 since sensor 110 has an input axis in parallel with the X-axis.

In the present invention, platform 100 is positioned such that the X-axis, in parallel with the input axis of the rate sensor, is positioned to point nominally west. Further, the platform is positioned such that the amount of tilt of platform 100 about the Y-axis is small, and that the amount of tilt of platform 100 about the X-axis is also small, i.e. the platform is nominally horizontal. However, there is an assumed settling of platform 100 such that there can exist a rate of tilt about the X-axis which can be observed by the angular rate sensor 110. (Rate of tilt about the Y-axis has no effect on the sensor 110 and therefore need not be considered.)

FIG. 2 illustrates the position of platform 100 relative to the earth's N-S and E-W axes.

FIGS. 2a, 2b, 2c and 2d show various positions of platform 100 in which the platform is positioned at the equator, that is where the latitude, L, is zero angular degrees.

Figure 2A:
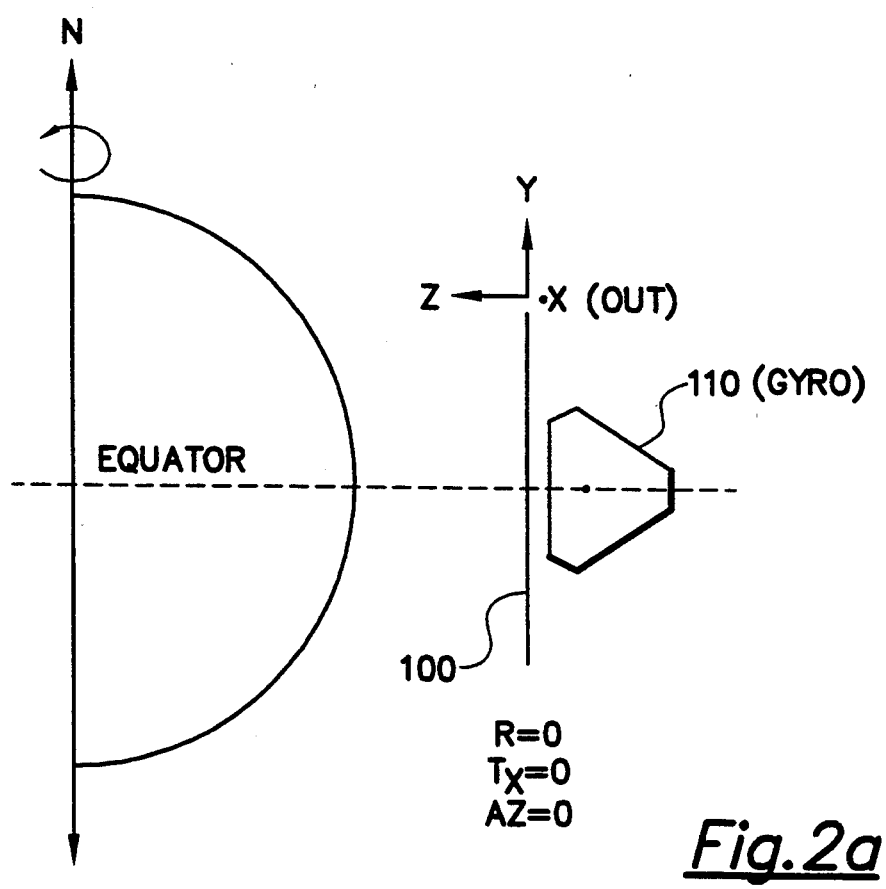
FIG. 2a-g is a geometrical depiction of the reference platform in relationship to its position on earth.

FIG. 2a illustrates the platform 100 being positioned such that the X-axis is pointing due west and the tilt indication $T_x$ is indicating zero tilt. As defined herein, and illustrated in FIG. 2a, the azimuth angle AZ is 0°. In this situation, the sensor 110 output signal R is zero since no component of the earth's rotation is parallel with the input axis of rotation rate sensor.

Figure 2B:
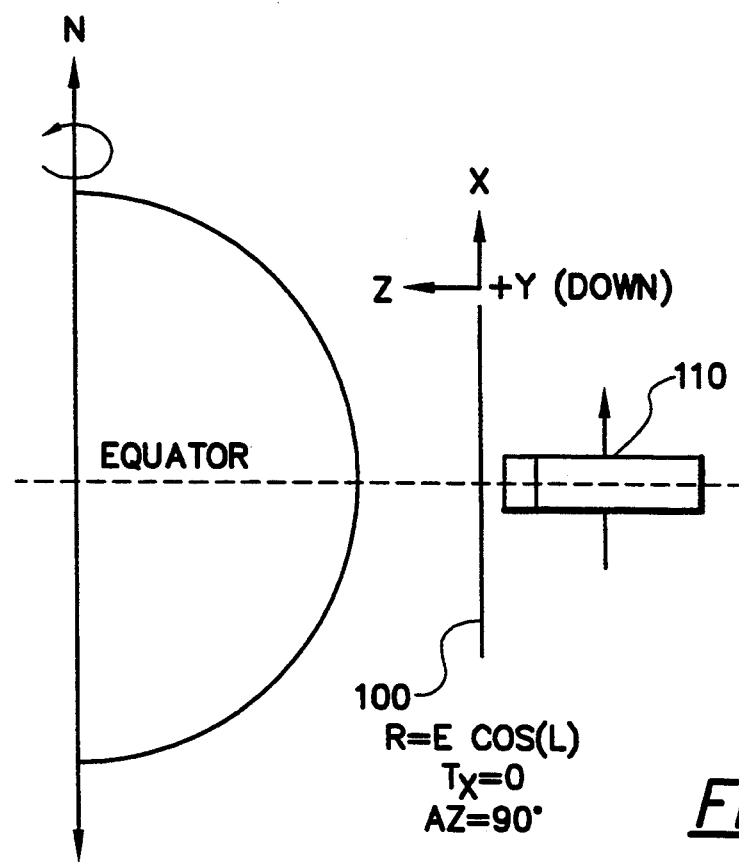

FIG. 2b illustrates the position of the platform 100 in which the input axis of sensor 110 is pointing to true north, thereby defining an azimuth angle of 90°. In this situation, the angular rate sensor 110 will generally provide an indication representative of the earth's rotation rate defined as "E".

Figure 2C:
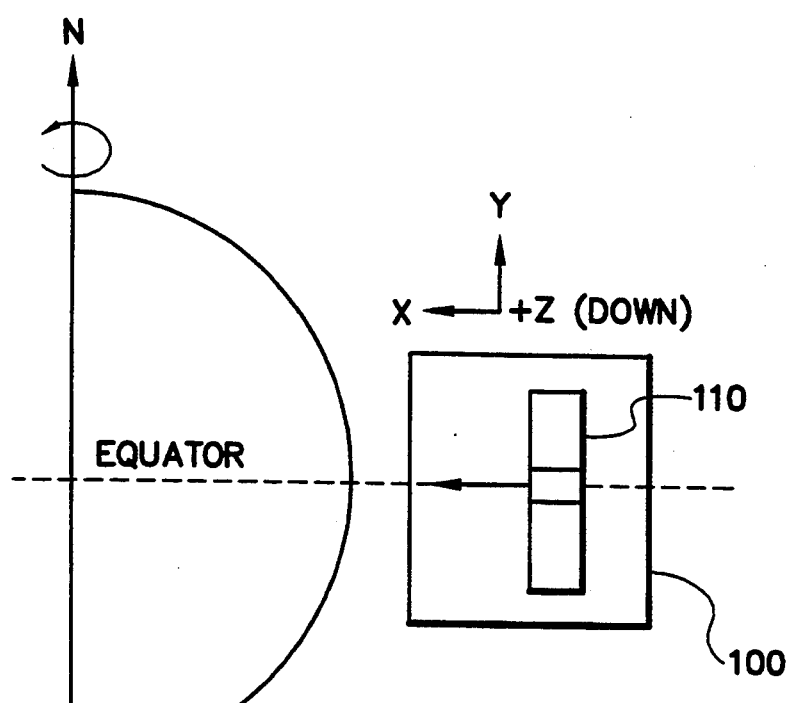
Figure 2D:
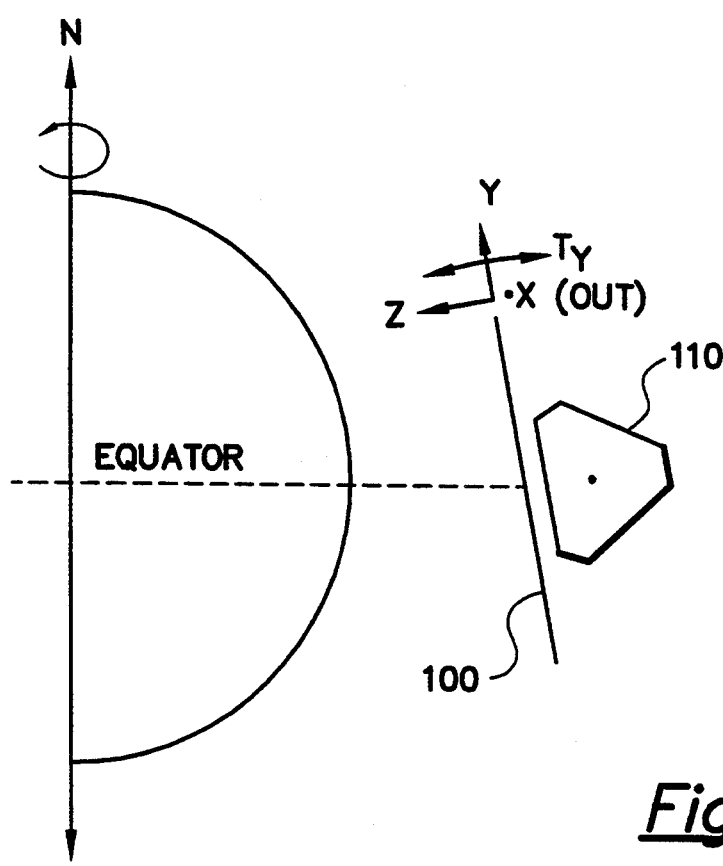
Figure 2E:
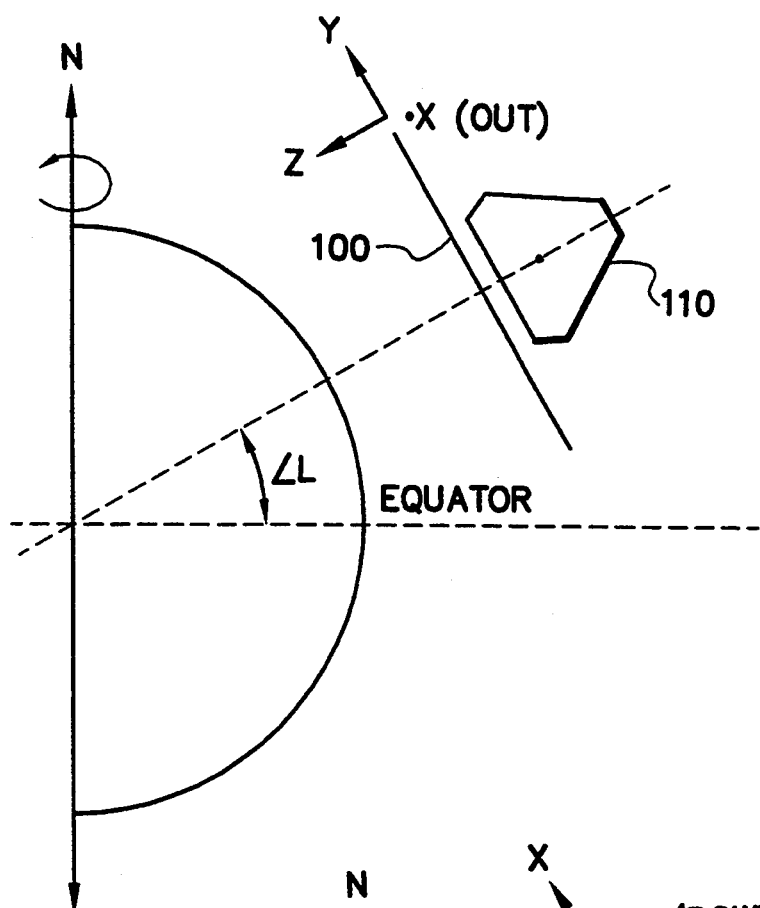
Figure 2F:
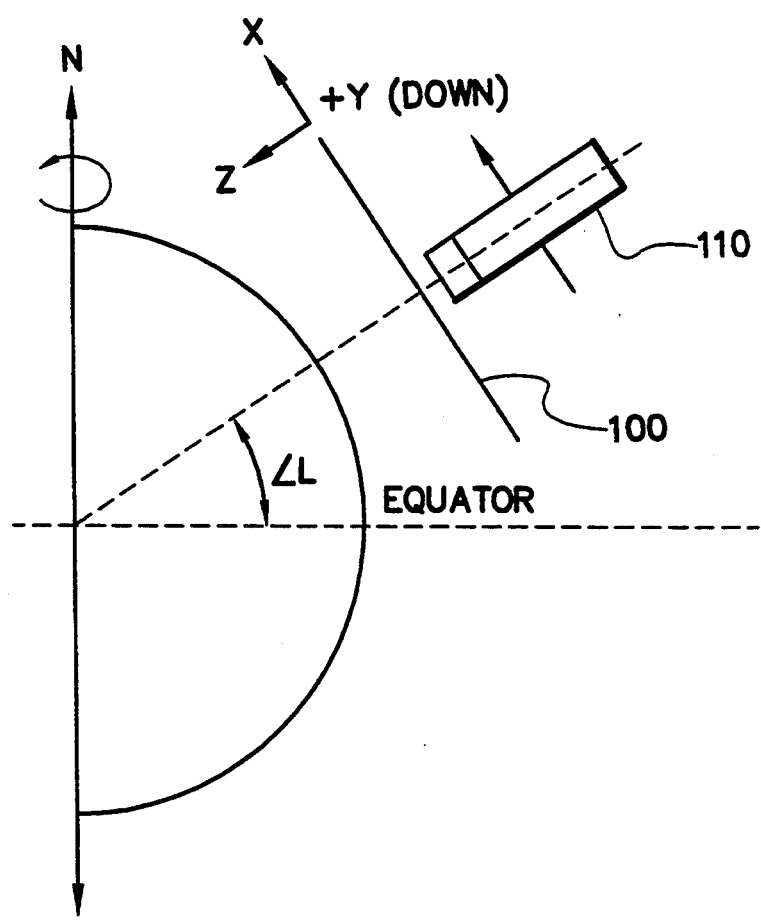
Figure 2G:
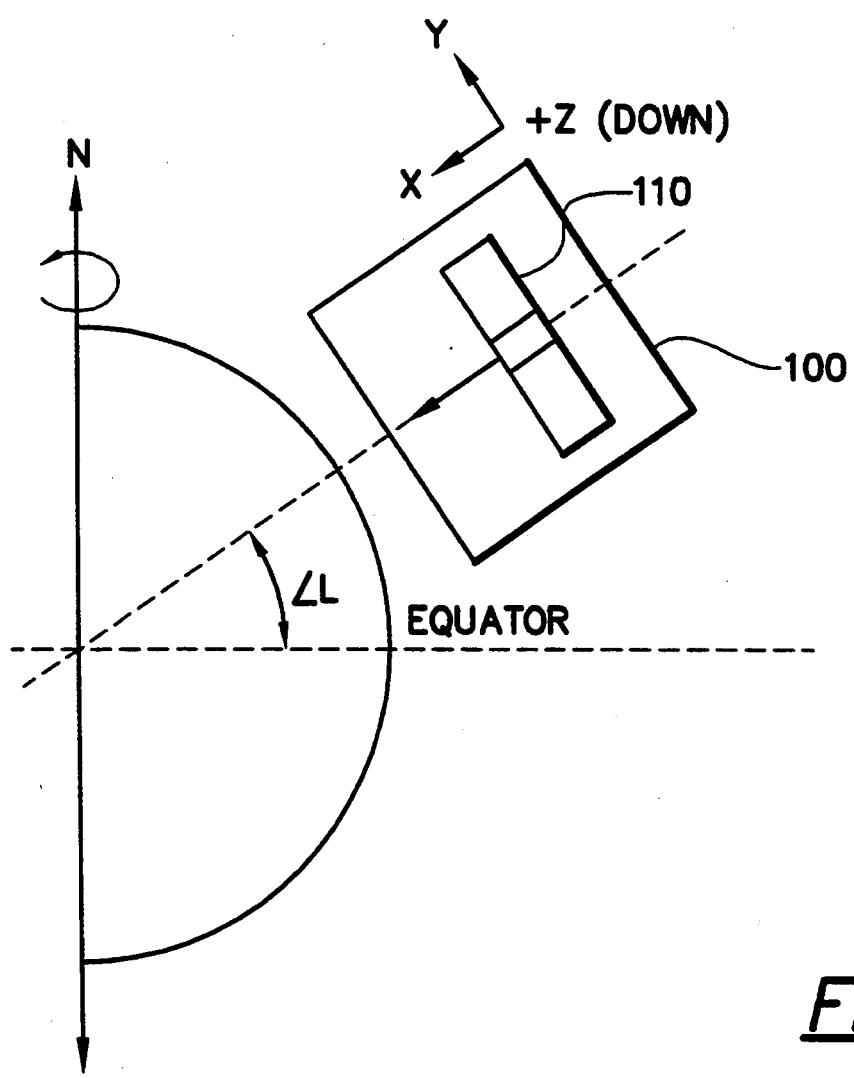

FIGS. 2e, 2f, and 2g illustrate corresponding positions of platform 100 in which the Z-axis is pointing toward the center of the earth at the latitude angle "L" relative to the equator. Like FIG. 2b, the angular rate sensor 110 when positioned as illustrated in FIG. 2e, observes no rotation rate. However, when the input axis to sensor 110 is pointing at an azimuth angle of 90°, i.e. the input axis to the sensor is pointing north, the sensor will have an output indicative of the earth's rate corrected by the term cosine (L), where L is again the latitude of the position of platform 100.

Thus, it can be readily seen that in the condition where there is no tilt of platform 100 about the Y-axis and no tilt rate about the X-axis of the platform, the azimuth angle may be calculated as follows:

$$AZ = \arcsin \frac{R}{E \cos(L)} \qquad (1)$$

where R is the rate of rotation observed by the angular rate sensor 110, E is the earth's rotation rate, and L is the latitude of the position of platform 100.

FIGS. 2c and 2g illustrate the situation where platform 100 is tilted 90° about the Y-axis such that the X-axis of platform 100 is pointing toward the center of the earth. In this situation, the angular rate sensor 110 has a zero output when the platform is positioned at the equator as illustrated in FIG. 2c. On the other hand, when the platform is at a latitude other than at the equator, the azimuth angle, as calculated by Equation (1) must be corrected by the following term:

$$AZ = \text{(due to tilt)} = \frac{E \sin(L) \sin(T_x)}{E \cos(L)} \quad (2)$$

For small angles of tilt, $T_x$, equation (2) reduces to:

$$AZ = T_x \tan(L) \quad (3)$$

FIG. 2d illustrates the situation where there exists an angular rate movement "S" of the platform 100 about the X-axis, i.e., rate of tilt $T_y$ about the X-axis. In this situation, any rate of angular tilting of the platform 100 will be observed directly by the rate sensor 110. Thus, the output of sensor 110 must be compensated for the rate of tilt. The correction may be mathematically described by:

$$AZ = \text{(due to tilt rate)} = \frac{S}{E \cos(L)} \quad (4)$$

Figure 3:
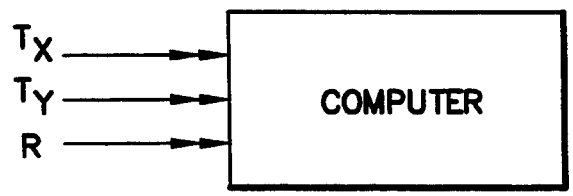
FIG. 3 illustrates the inputs to a computational device.

As illustrated in FIG. 3, the output signals R, $T_x$, and S are operated on by a computer or the like to provide an azimuth angle as defined by:

$$AZ = \frac{R}{2E \cos(L)} - T_x E \tan(L) + \frac{S}{E \cos(L)} \quad (5)$$

It should be noted that "sign" of the error terms depends on the definition of "positive" regarding angular rate sensor input axis.

In the preferred embodiment, angular rate sensor 110 is a ring laser angular rate sensor, sometimes referred to as a ring laser gyro. A ring laser gyro is preferred because of its accuracy, low cost, and that there are no moving parts (as compared with gyro spinning masses). Preferably, the platform is a rotatable platform with two indexed positions 401 and 402 precisely 180° apart. The platform is then positioned such that the input axis of sensor 110, i.e. the X-axis, points to a rough-west (or east) position. After positioning the platform in this manner, reading of sensor rotation R, tilt $T_x$, and tilt rate S are taken—these are defined as "rough-west" measurements. Then, the platform is indexed or rotated 180° via platform rotation means 400 and a second set of readings are taken.

These are defined as "rough-east" measurements. Taking these two sets of readings and appropriately differing and scaling the readings eliminates bias terms in the readings. For example, assuming that the rough-east-west axis of the platform is off of true east-west by only a small horizontal error about the Z-axis, not a tilt error, effective gyro bias is cancelled by subtracting the rough-east rotation rate reading from the rough-west rotation rate reading and then dividing by twice the earth rate corrected for latitude. This latter term provides a rotation rate value R having bias correction.

Figure 4:
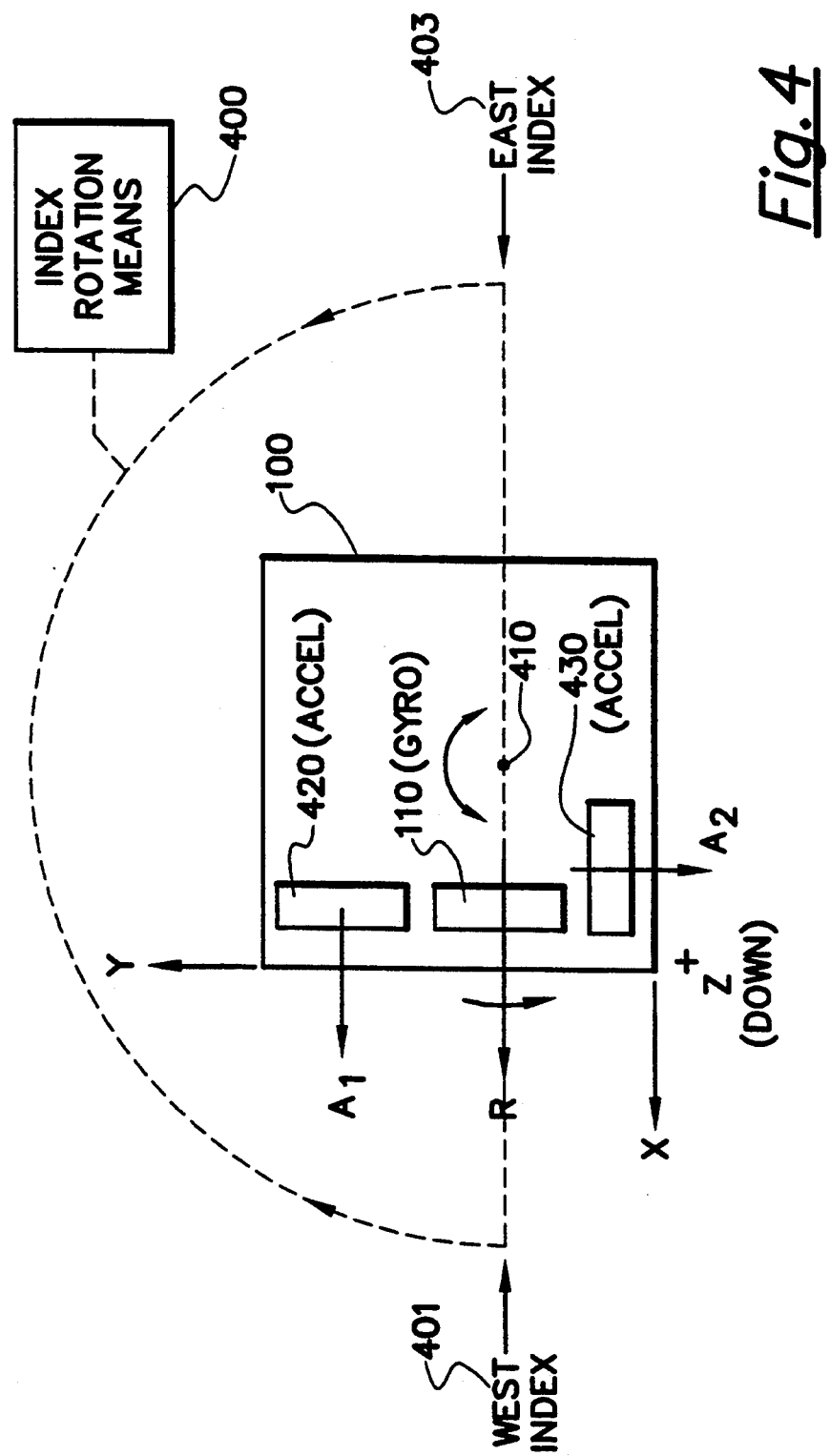
FIG. 4 shows alternative implement action of a northfinding apparatus.

FIG. 4 illustrates an embodiment of a sensor package or platform 100 in which the tilt indicator 120 is provided by an accelerometer 420 having its input axis in parallel with the X-axis. Accelerometer 420 provides the function of tilt indicator 120, i.e., a measurement of tilt of platform 100 about the Y-axis. Accelerometer 430 having its input axis along the Y-axis provides the function of tilt rate indicator 130. As indicated earlier, it is preferred to take the two sets of readings of each sensor, rough-east and rough-west, to eliminate bias terms. In the following discussion, assume that the two sets of readings have been taken with accelerometer 420 and 430.

With these assumptions, the angle of tilt, $T_x$ is determined by subtracting accelerometer 420 output signal, $A_1$, during the rough-east rotation rate measurement R from the accelerometer 420 reading during the rough-west rotation rate measurement, and then dividing the difference by twice the earth's gravitational acceleration (2G). For small angles of tilt, the result gives the angle of tilt around the horizontal north-south axis or here shown as the Y-axis of platform 100. (For small angles of tilt sin T=T) Of course, if a bubble level tilt indicator was used, the tilt is simply half the difference between the east-west bubble tilts measured during the rough-east and then the rough-west values.

The value of S is obtained by measuring the rate-of-change of the output of accelerometer 430. Time differentiation of the output of the accelerometer 430 will yield the value of S. Preferably, the value of S is determined by measuring the change in tilt value $T_y$ over a small time increment about the time that each rotation rate measurement is taken. With use of the two sets of readings corresponding to the rough-east and rough-west direction of the platform, the value of S is half the difference of the readings. Each value of S is, of course, the acceleration reading $A_2$ divided by G, for small angles of tilt $T_y$.

Readings of $T_x$, S and R taken in this manner can then be presented to computer 300 to provide the azimuth angle in accordance with equation (5).

Those skilled in the art will recognize that only preferred embodiments of the invention have been disclosed herein and that the embodiment may be altered and modified without departing from the true spirit and scope of the invention as defined in the accompanying claims. Specifically, there are a wide range of rotation rate sensors for providing the function as intended. Further, there are a wide range of apparatuses for providing an indication of tilt including the bubble level indicators and the accelerometer techniques disclosed.

Disclosed, has been shown how either a single set of readings or two sets of readings can define an azimuth angle. Further, also has been shown that an azimuth angle taken by rough-east and rough-west readings can be utilized in order to eliminate bias effects in the measurement sensors.

The embodiments of the invention in which an exclusive property or right is claimed are defined as follows:

1. A northfinding apparatus comprising:
   a platform having a sensor component mounting surface, and associated with said platform is a fixed orthogonal coordinate system defined by X, Y, and Z reference axes, and said Z axis being aligned substantially with vertical relative to the earth's surface;
   angular rate sensing means secured to said platform, said angular rate sensing means having an input axis aligned substantially with said X axis for providing an output signal R representative of the rotation rate sensed about said input axis;

tilt indicating means, secured to said platform, for providing an output signal representative of the angle of tilt $T_x$ of said platform from true horizontal relative to the center of the earth and about said Y-axis;

tilt rate indicating means, secured to said platform, for providing an output signal S representative of the rate of tilt of said platform about said X-axis;

means for computing the azimuth angle AZ of said platform representative of the angle between said X-axis and the direction of true north as a function of said output signals representative of tilt angle $T_x$, tilt rate S, and angular rotation rate R, and the earth's latitude at which said platform is positioned, and the earth's rotation rate.

2. The apparatus of claim 1 wherein said angular rate sensing means is a ring laser angular rate sensor.

3. The apparatus of claim 1 wherein said tilt indicating means comprises a first accelerometer, and said tilt rate indicating means comprises a second accelerometer, and including means for time differentiating said second accelerometer.

4. The apparatus of claim 1 wherein:
said angular rate sensor comprises a ring laser angular rate sensor;
said tilt indicating means comprises a first accelerometer; and
said tilt rate indicating means comprises a second accelerometer and means for taking the time differentiation of the output of said second accelerometer.

5. The apparatus of claim 1 further comprising:
means for rotating said platform between two positions 180 degrees apart;
said computing means including means for computing said azimuth angle AZ for both positions of said platform, and combining said azimuth angle values for said two positions in accordance with a selected function to lessen any bias in said angular rate sensing means output signal.

* * * * *